(12) United States Patent
Larsson et al.

(10) Patent No.: US 7,200,500 B2
(45) Date of Patent: Apr. 3, 2007

(54) DETERMINING PARAMETERS OF AN EQUIVALENT CIRCUIT REPRESENTING A TRANSMISSION SECTION OF AN ELECTRICAL NETWORK

(75) Inventors: Mats Larsson, Baden (CH); Christian Rehtanz, Baden-Dättwil (CH); Marek Zima, Baden (CH)

(73) Assignee: ABB Research Ltd, Zurich (CH)

( * ) Notice: Subject to any disclaimer, the term of this patent is extended or adjusted under 35 U.S.C. 154(b) by 0 days.

(21) Appl. No.: 10/671,561

(22) Filed: Sep. 29, 2003

(65) Prior Publication Data

US 2004/0073387 A1 Apr. 15, 2004

(30) Foreign Application Priority Data

Oct. 10, 2002 (EP) .................................. 02405872

(51) Int. Cl.
G01R 19/00 (2006.01)
C06F 19/00 (2006.01)
(52) U.S. Cl. .................. 702/64; 307/105; 323/207; 700/292; 702/57; 703/3
(58) Field of Classification Search ................. 702/57, 702/60, 64, 65, 107, 124; 187/399; 307/105; 318/767, 807, 809; 323/207; 363/54; 703/3, 703/18; 700/292; 324/522
See application file for complete search history.

(56) References Cited

U.S. PATENT DOCUMENTS 3,883,724 A * 5/1975 Pradhan et al. ................. 703/3
5,198,746 A * 3/1993 Gyugyi et al. ............... 323/207
6,466,031 B1 * 10/2002 Hu et al. ..................... 324/522
6,476,521 B1 * 11/2002 Lof et al. .................... 307/105
2003/0040846 A1 * 2/2003 Rehtanz et al. .............. 700/292

FOREIGN PATENT DOCUMENTS

EP 127709 6/2002

OTHER PUBLICATIONS

Ota et al, "Evaluation of stability and electric power quality in power system by using phasor measurements", *2000 IEEE*, vol. 3, pp. 1335-1340 (2000), 2000 International Conference on Power System Technology. Proceedings of International Conference on Power System Technology (Powercon 2000), (Dec. 4-7, 2000), Perth, WA, Australia (XP 002232025).

(Continued)

*Primary Examiner*—Bryan Bui
*Assistant Examiner*—John Le
(74) *Attorney, Agent, or Firm*—Buchanan Ingersoll & Rooney PC

(57) ABSTRACT

A method for determining an equivalent impedance of a transmission section of an electrical network, includes representing the transmission section as having at least two interfaces with other sections of the network. For each interface, a voltage phasor and a current phasor flowing through the interface are determined from simultaneously made measurements at the interfaces. From the phasors, the equivalent impedance is calculated. The required simultaneousness of the phasor measurements is achieved by means of Phasor Measurement Units (PMUs) that are synchronized via the Global Positioning System (GPS).

12 Claims, 2 Drawing Sheets

OTHER PUBLICATIONS

Abstract on Yunping et al, "The studies on real time measurement of power angles of generators located at different locations for stability control", Proceedings of the International Power Engineering Conference, Proceedings of the IPEC '99. International Power Engineering Conference, Singapore, May 24-26, 1999, Database accession No. 6761504 (XP002232126).

Abstract of Too et al, "The studies on real time measurement of power angles of generators located at different locations for stability control", J. Chin. Inst. Elect. Eng., May 2001, Chinese Inst. Electr. Eng, Taiwan, Taiwan (2001), Database accession No. 6945977 (XP002232127).

Abstract of Hart et al, "PMUs—a new approach to power network monitoring", The Institution of Electrical Engineers, Stevenage, GB, ABB Review, 2001, ABB Asea Brown Boveri, Switzerland, Database accession No. 6936604 (XP002232128).

Engel, "Splice: an analytical network analysis software", *IEEE Transactions on Education*, IEEE, USA, vol. 39, No. 3, pp. 394-398 (Aug. 1996) (XP002232029).

Gönen, *Electric Power Transmission System Engineering*, pp. 116-123 (1988), Wiley, U.S. (XP002232030).

Kusic, "Computer-aided power systems analysis", pp. 238-239 (1986), Prentice-Hall, U.S. (XP002232031).

\* cited by examiner

DETERMINING PARAMETERS OF AN EQUIVALENT CIRCUIT REPRESENTING A TRANSMISSION SECTION OF AN ELECTRICAL NETWORK

FIELD OF THE INVENTION

The invention relates to large-scale electric power transmission networks, and, more particularly, to a method, computer program and apparatus for determining parameters of an equivalent circuit representing a transmission section of an electrical network.

BACKGROUND OF THE INVENTION

Electric power transmission and distribution systems or networks comprise high-voltage tie lines for connecting geographically separated regions, and substations for transforming voltages and for switching connections between lines. Power generation and load flow in a network with several substations is controlled by a central energy management system. An important issue in the control of a power generation and load flow is to keep the network stable, i.e. to avoid voltage collapses and swings. A method for assessing network stability, based on voltage margins, is described in EP 1 217 709. This patent application and articles cited therein describe a "Voltage Instability Predictor" (VIP) that measures currents and voltages locally in order to infer a proximity to voltage collapse. The concept of the VIP is based on an equivalent network as shown in FIG. 3. One part of an electric power system is treated as a power source, another part as a load. The power source is represented by its Thévenin equivalent 1 with a source voltage $E_{th}$ and a Thévenin or source impedance $Z_{th}$. An apparent load impedance $Z_1$, represents the load. Both the Thévenin impedance $Z_{th}$ and the apparent load impedance $Z_1$ are estimated from the current and voltage measurements $\bar{i}_2, \bar{v}_2$ by a VIP device. The relation of these impedances, expressed by a stability margin or power margin, indicates how close the power system or network is to collapsing.

This approach uses measurements taken at a single load bus. A single set of measurements does not contain enough information to directly compute the parameters of the Thévenin equivalent $\bar{E}_{th}, \bar{Z}_{th}$, however these can be estimated using for example using the least-squares method once at least two sets of measurements made at different times are available. For accurate estimation of these parameters, a sufficient change in the measurements must have occurred, e.g. due to load change. During this time the generation and transmission network is assumed to remain constant, which introduces an estimation error. Furthermore, the estimation is noise-sensitive and introduces a time-delay. The practical applicability of the method is therefore limited.

Other approaches are based on a complete set of system information, that is, all voltages and currents are measured, and the impedances of all lines and loads and generator capability diagrams are measured or estimated. Although these techniques are powerful tools capable of very accurately assessing the voltage stability of the network, the large number of measurements required makes them expensive and impractical to implement in practice.

It is therefore desirable to provide improved and efficient means to determine a model of a section of an electrical network, in particular for a section that essentially serves for transmitting power from a generating section to a load section.

DESCRIPTION OF THE INVENTION

It is therefore an object of the invention to create a method, computer program and apparatus for determining parameters of an equivalent circuit representing a transmission section of an electrical network of the type mentioned initially, which overcomes the disadvantages mentioned above and allows a fast assessment of network stability.

These objects are achieved by a method, computer program and apparatus for determining parameters of an equivalent circuit representing a transmission section of an electrical network.

In the inventive method, the transmission section is representable as having at least two interfaces with other sections of the network, and the method comprises the steps of a) determining, for each of the interfaces, a voltage phasor at the interface and a phasor of a current flowing through the interface, the measurements at the different interfaces being made essentially simultaneously, and b) computing, from said voltage and current phasors, values of impedances constituting the equivalent circuit.

This allows determining the equivalent circuit from a single set of essentially simultaneous measurements. There is no time delay incurred by having to measure a time series of phasor values and estimating impedances, as in the state of the art.

In a preferred embodiment of the invention, at least one interface comprises at least two physical power lines, and the voltage phasor at the interface is determined as a weighted sum of the voltages at the power lines. This allows representing a transmission section that is connected to a load or generation section with more than just a single power line.

In a further preferred embodiment of the invention, a current phasor representing a current through the interface is preferably computed from the voltage phasor at the interface and from a power flow through the power lines constituting the interface.

The computer program for determining parameters of an equivalent circuit representing a transmission section of an electrical network according to the invention is loadable into an internal memory of a digital computer, and comprises computer program code means to make, when said computer program code means is loaded in the computer, the computer execute the method according to the invention. In a preferred embodiment of the invention, a computer program product comprises a computer readable medium, having the computer program code means recorded thereon.

A data processing system or apparatus for determining parameters of an equivalent circuit representing a transmission section of an electrical network according to the invention comprises means for carrying out the steps of the method according to the invention. In a preferred embodiment of the invention, the data processing system is an apparatus comprising a data processor, a memory coupled to the processor and computer program code means stored in said memory, where said computer program code means, when executed by the processor, causes the method according to the invention to be executed.

Further preferred embodiments are evident from the dependent patent claims.

BRIEF DESCRIPTION OF THE DRAWINGS

The subject matter of the invention will be explained in more detail in the following text with reference to preferred exemplary embodiments that are illustrated in the attached drawings, in which.

The reference symbols used in the drawings, and their meanings, are listed in summary form in the list of reference symbols. In principle, identical parts are provided with the same reference symbols in the figures.

DETAILED DESCRIPTION OF PREFERRED EMBODIMENTS

Figure 1:
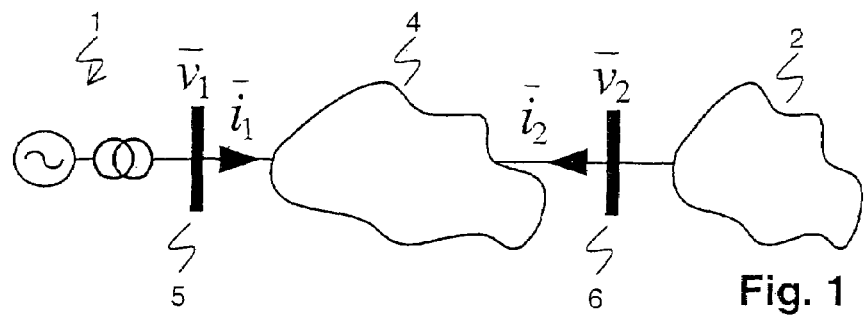
FIG. 1 schematically shows a power network with a transmission corridor.
Figure 2:
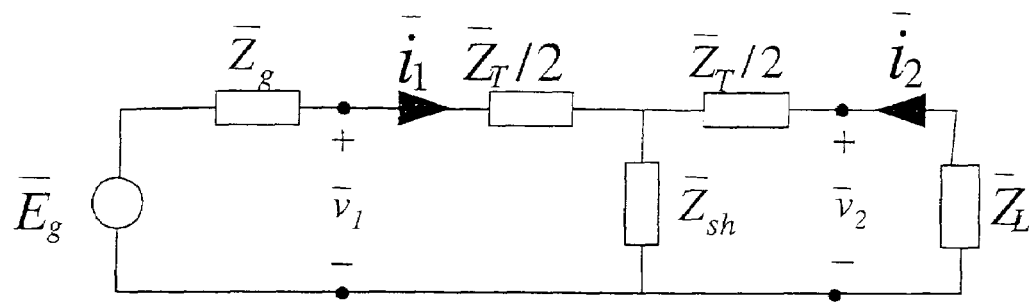
FIG. 2 shows an equivalent circuit of the power network with separately modelled generating and transmission sections.

FIG. 1 schematically shows a power network with a transmission section 4 having a first interface 5 to a generating section 1 and a second interface 6 to a load section 2. The transmission section 4 has two interfaces 5,6 and is therefore also called a transmission corridor. The object of the invention is to determine parameters of an equivalent network or circuit that represents the electrical behaviour of the transmission corridor 4. In a preferred embodiment of the invention, the equivalent is a T-equivalent network comprising a transmission impedance $\bar{Z}_T$ and a shunt impedance $\bar{Z}_{sh}$ as shown in FIG. 2, in another preferred embodiment of the invention, the equivalent is a Π-equivalent. The generating section 1 is modelled separately from the transmission section 4 and represented by a Thévenin equivalent comprising $E_g, Z_g$.

The transmission section 4 serves to transmit electric power from the generating section 1 to the load section 2 of the network. These sections are predominantly generating, transmitting and load sections. In reality it is possible for a generating section 1 to comprise loads, for the transmission section 4 to comprise loads and generators, and for the load section 2 to comprise generators. However, effects of such loads and generators is assumed to be negligible with respect to overall power flow. These generators and loads are then automatically included in the shunt impedance of the equivalent circuit, and are thus assumed to exhibit approximately impedance characteristics. However, the equivalent network does not accurately represent a generator that is controlled to provide a constant voltage or power. In such cases, generated or consumed power of power generators and loads that are part of the transmission section 4 should be small in comparison to the power transmitted through the transmission section 4.

According to the invention, phasor measurements are made at both ends or interfaces of the transmission corridor 4. This allows splitting the estimation into two stages. First, the parameters of the equivalent of the transmission corridor are determined through direct calculation from measurements made at both interfaces and synchronised, i.e. at essentially the same time. Second, a Thévenin equivalent of the feeding generators is computed. Once the parameters of the transmission section 4 and generation section 1 are known, stability analysis can be carried out analytically and various stability indicators may be calculated using well-known methods. An advantage over the present state of the art is that parameters of the equivalent network are computed from essentially simultaneous phasor measurements, in contrast to VIP-type approaches that need a series of measurements over time and thus introduce a time delay for obtaining a network parameter estimate.

Phasor data is determined with a phasor measurement unit (PMU) that resides, for example, at a feeder at the bay level of substations or at branching points along transmission lines. A voltage phasor represents, for example, a voltage of the feeder or line, while a current phasor represents current flowing through the feeder or line.

The phasor data represents a phasor and may be a polar number, the absolute value of which corresponds to either the real magnitude or the RMS value of a quantity, and the phase argument to the phase angle at zero time. Alternatively, the phasor may be a complex number having real and imaginary parts or the phasor may use rectangular or exponential notation. Phasors may be used to represent quantities such as the voltage, current, power or energy associated with a phase conductor or an electronic circuit. By contrast, conventional sensing devices used in power networks generally measure only scalar, average representations, such as the RMS (root mean square) value of a voltage, current etc.

In some PMU applications, the phasor data is collected from phasor measurement units that are distributed over a large geographic area, i.e. over tens to hundreds of kilometers. For applications in which the phasor data from these disparate sources are analysed in conjunction, they must refer to a common phase reference. In other words, the different phasor measurement units have local clocks that are synchronised to within a given precision. Such a synchronisation of the phasor measurement units is preferably achieved with a known time distribution system, for example the global positioning (GPS) system. In a typical implementation, the phasor data is determined at least every 200 or every 100 or preferably every 40 milliseconds, with a temporal resolution of preferably less than 1 millisecond. In a preferred embodiment of the invention, the temporal resolution is less than 10 microseconds, which corresponds to a phase error of 0.2 degrees. Each measurement is associated with a time stamp derived from the synchronised local clock. The phasor data therefore preferably comprises time stamp data.

The parameters of a T-equivalent of the transmission corridor 4 are calculated, including any load or generation that may be present in the transmission corridor. Applying Ohm's and Kirchhoff's laws, with the measured phasors denoted by complex values $\bar{v}_1, \bar{i}_1$ and $\bar{v}_2, \bar{i}_2$, the complex impedances $\bar{Z}_T, \bar{Z}_{sh}$ and $\bar{Z}_L$ are calculated as follows:

$$\bar{Z}_T = 2\frac{\bar{v}_1 - \bar{v}_2}{\bar{i}_1 - \bar{i}_2} \tag{1}$$

-continued $$\overline{Z}_{sh} = \frac{\overline{v}_2 \overline{i}_1 - \overline{v}_1 \overline{i}_2}{\overline{i}_1^2 - \overline{i}_2^2}$$

$$\overline{Z}_L = \frac{\overline{v}_2}{-\overline{i}_2}$$

The complex voltage $\overline{E}_g$ and impedance of the equivalent voltage source $\overline{Z}_g$ cannot be calculated in the same straightforward way, so one of them must be assumed to be known to avoid the time-delay of an estimation procedure similar to that in the VIP-type approaches. If the generators have voltage controllers and can be assumed not to have capability limits, $\overline{E}_g$ can assumed to be constant and $\overline{Z}_g$ can then be calculated using the formula:

$$\overline{Z}_g = \frac{E_g - \overline{v}_1}{\overline{i}_1} \quad (2)$$

However, in most practical cases it is more realistic to assume that $\overline{Z}_g$ is known since it typically comprises step-up transformers and short transmission lines leading to the first interface 5 to the transmission corridor. Since the lines are short, they are less prone to change. In a preferred embodiment of the invention, the equivalent complex voltage of the generators is therefore computed as:

$$E_g = \overline{v}_1 + \overline{Z}_g \overline{i}_1 \quad (3)$$

Figure 3:
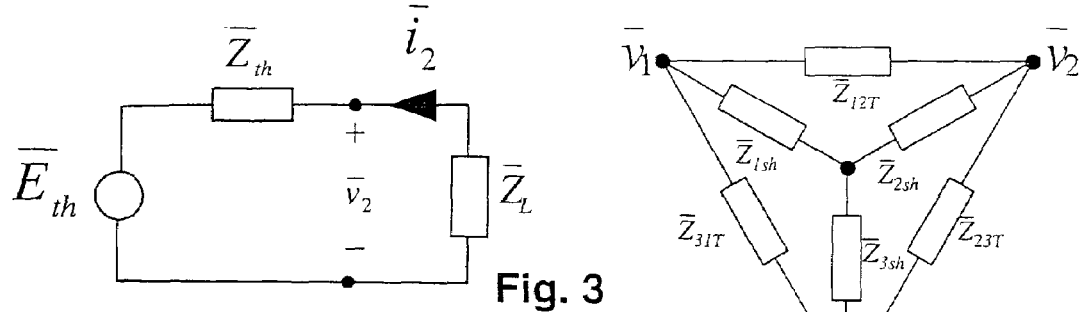
FIG. 3 shows an equivalent circuit of the power network with a combined model for the generating and transmission sections.

Once the parameters of the T- and Thévenin equivalent are calculated, a second Thévenin equivalent $\overline{E}_{th}, \overline{Z}_{th}$ for the combined generation and transmission corridor according to FIG. 3 can be calculated:

$$\overline{Z}_{th} = \frac{\overline{Z}_T}{2} + \frac{1}{\frac{1}{\overline{Z}_{sh}} + \frac{1}{\frac{\overline{Z}_T}{2} + \overline{Z}_g}} \quad (4)$$

$$\overline{E}_{th} = \overline{v}_2 \frac{\overline{Z}_{th} + \overline{Z}_L}{\overline{Z}_L}$$

Figure 7:
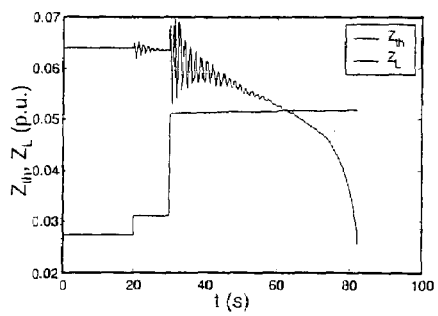
FIG. 7 shows time histories of impedances and Thévenin source voltage for an equivalent circuit of a collapsing network.
Figure 7:
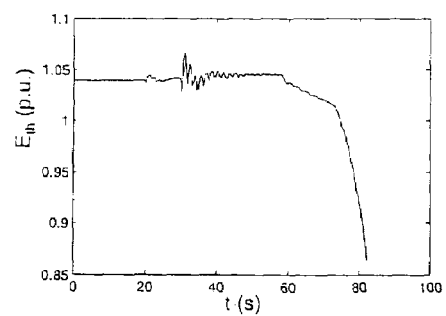

Based on this second Thévenin equivalent $\overline{E}_{th}, \overline{Z}_{th}$, stability analysis can be performed analytically in a known fashion, e.g. be detecting when the Thévenin $\overline{Z}_{th}$ impedance becomes smaller than the load impedance $\overline{Z}_L$. In a preferred embodiment of the invention, for determining the stability of a power network, the steps described above for determining the Thévenin equivalent of the generating section 1 and transmission section 4 are performed, followed by a further step of detecting a sudden change in the Thévenin source voltage $\overline{E}_{th}$ as an indicator of network instability. FIG. 7 shows an example of trajectories over time t of Thévenin impedance $\overline{Z}_{th}$ in relation to load impedance $\overline{Z}_L$ and of Thévenin source voltage $\overline{E}_{th}$. At the time t=30s a large load change causes oscillations in both load impedance $\overline{Z}_L$ and in Thévenin source voltage $\overline{E}_{th}$, well before instability is reached. Shortly after t=60, $\overline{Z}_L$ becomes smaller than $\overline{Z}_{th}$, which is a known indicator of instability. Shortly before t=60, a step change in $\overline{E}_{Th}$ indicates approaching instability.

Figure 5:
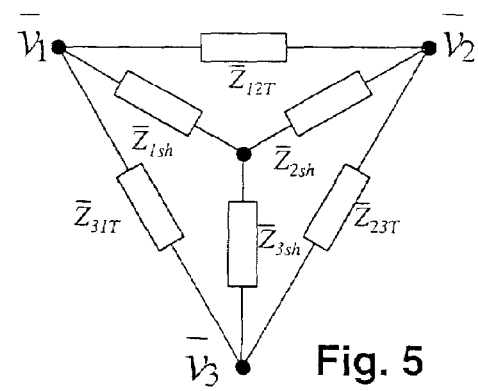
FIG. 5 shows an equivalent circuit of the transmission section of FIG. 4.
Figure 4:
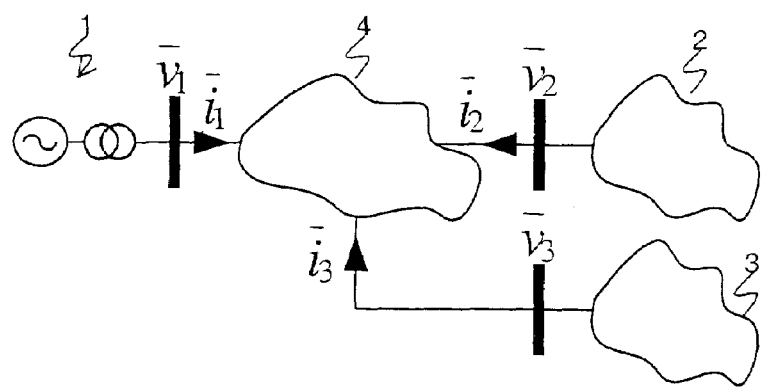
FIG. 4 schematically shows a power network with a transmission section having three interfaces to other sections of the power network.

In a further preferred embodiment of the invention, the transmission section 4 has three interfaces to other sections 1,2,3 of the network, as shown in FIG. 4, where a further section 3 is connected to the transmission section 4 through a further interface. In this case, the transmission section 4 is preferably modelled by an equivalent circuit as shown in FIG. 5. The equivalent circuit comprises three line impedances $\overline{Z}_{12T}, \overline{Z}_{23T}, \overline{Z}_{31T}$ interconnecting the interfaces having voltages $\overline{v}_1, \overline{v}_2, \overline{v}_3$ and three shunt impedances $\overline{Z}_{1sh}, \overline{Z}_{2sh}, \overline{Z}_{3sh}$ connecting the interfaces to a common node. The values of the impedances are determined from voltage and current phasors at the interfaces by application of Kirchhoff's laws. In a similar way, the inventive idea can be generalised to networks with a larger number terminals.

Figure 6:
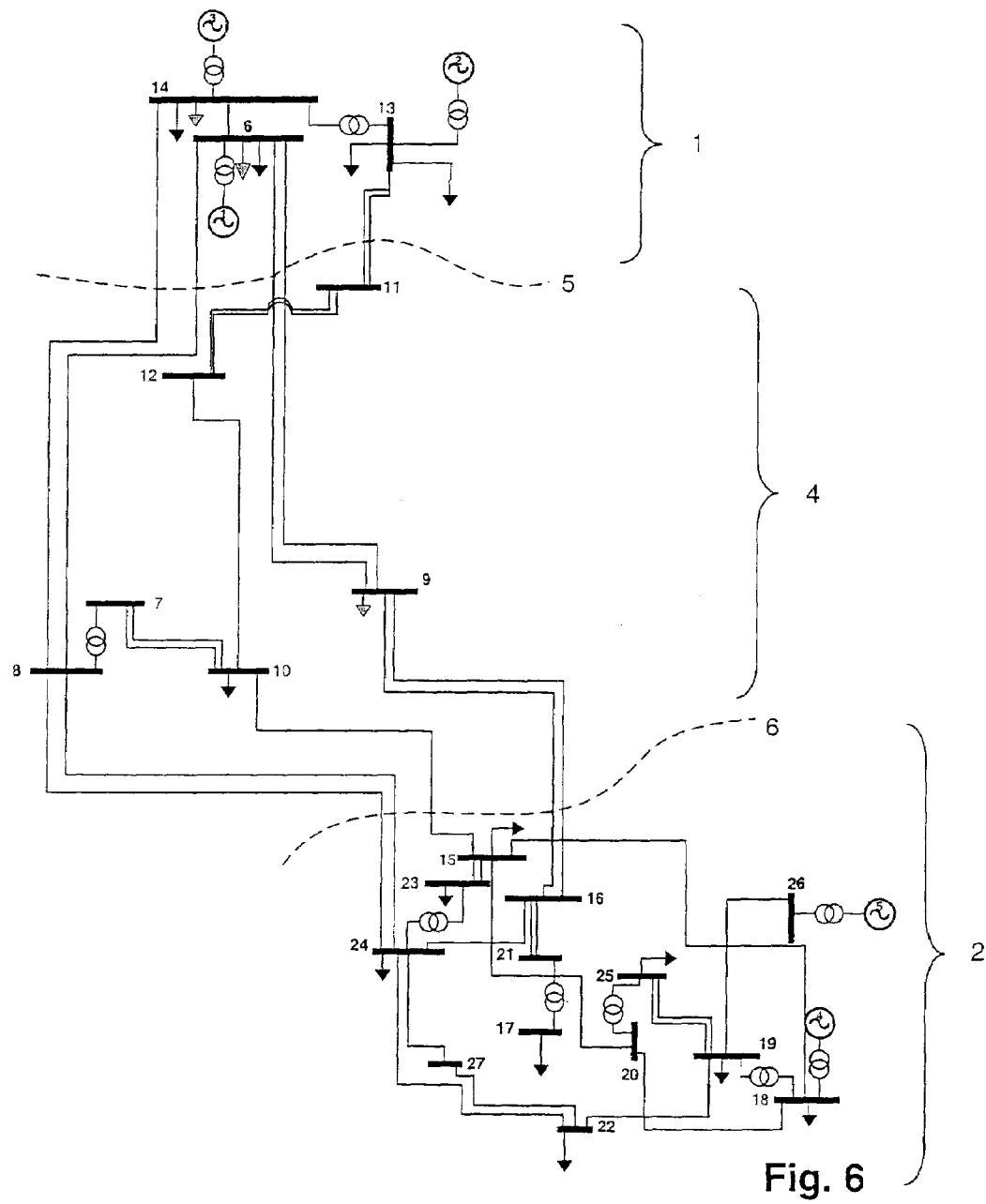
FIG. 6 schematically shows power network with a transmission corridor having more than one power line at interfaces to other sections of the power network.

In a further preferred embodiment of the invention, at least one interface between the transmission section 4 and other sections comprises at least two physical or actual power lines, as is shown in FIG. 6. For a network as in FIG. 6, first main load and generation centres or sections must be identified.

In this case, a distinct generating section 1 is found in the area above a first cut line labelled 5, which comprises three major generators and some shunt compensation but only a few minor loads. Between the first cut line 5 and a second cut line 6 lies a section with no generation equipment and only a few minor loads, which shall be considered as transmission section 4. This is the transmission corridor, whose stability is of interest. In the equivalencing procedure described above, the loads will be implicitly included in shunt impedances.

Below the second cut line 6 is an area with predominantly load character. There are some minor generation units, but in cases where the voltage stability is endangered, these generators would have exceeded their capability limits and thus no longer contribute to stabilization. It is therefore reasonable to include them in the shunt impedance modelling the load.

Network section interfaces or region boundaries are now defined by the two transfer cuts 5 and 6. According to a preferred embodiment of the invention, two virtual buses are defined, one for each end of the transmission corridor 4. Buses 6, 13 and 14 of the original system are grouped into a virtual bus corresponding to the first interface 5, and buses 24, 15 and 16 are grouped into a virtual bus corresponding to the second interface 6. The part of the system between cuts 1 and 2 is considered a virtual transmission corridor.

The active and reactive power through the interfaces 5,6 is computed as the sum of active and reactive power transfer p,q on all lines crossing the respective interface 5,6 as follows:

$$p_{cut1} = p_{14\_8} + p_{6\_8} + p_{6\_9\_1} + p_{6\_9\_2} + p_{13\_11\_1} + p_{13\_11\_2}$$

$$q_{cut1} = q_{14\_8} + q_{6\_8} + q_{6\_9\_1} + q_{6\_9\_2} + q_{13\_11\_1} + q_{13\_11\_2}$$

$$p_{cut2} = p_{24\_8_{13}} + p_{24\_8\_2} + p_{15\_10\_1} + p_{15\_10\_2} + p_{16\_9\_1} + p_{16\_9\_2}$$

$$q_{cut2} = q_{24\_8_{13}} + q_{24\_8\_2} + q_{15\_10\_{13}\_1} + q_{15\_10\_2} + q_{16\_9\_1} + q_{16\_9\_2} \quad (5)$$

Since the voltages $\overline{v}_1$ and $\overline{v}_2$ are voltages of virtual buses, they cannot be directly measured and must be extracted from other measurements. In a preferred embodiment of the invention, they are computed as a weighted average of the voltage of the buses the interface comprises. The weightings are proportional to the active power transported by the lines originating at that bus through the relevant transfer cut.

$$\bar{v}_1 = \frac{p_{14\_8}\bar{v}_{14} + (p_{6\_8} + p_{6\_9\_1} + p_{6\_9\_2})\bar{v}_6 + (p_{13\_11\_1} + p_{13\_11\_2})\bar{v}_{13}}{p_{14\_8} + p_{6\_8} + p_{6\_9\_1} + p_{6\_9\_2} + p_{13\_11\_1} + p_{13\_11\_2}} \quad (6)$$

$$\bar{v}_2 = \frac{(p_{24\_8\_1} + p_{24\_8\_2})\bar{v}_{24} + (p_{15\_10\_1} + p_{15\_10\_2})\bar{v}_{15} + (p_{16\_9\_1} + p_{16\_9\_2})\bar{v}_{16}}{p_{24\_8\_1} + p_{24\_8\_2} + p_{15\_10\_1} + p_{15\_10\_2} + p_{16\_9\_1} + p_{16\_9\_2}}$$

Other variants for computing $\bar{v}_1$ and $\bar{v}_2$ would be the mean value, or simply selecting one of the available voltage measurements from the area. With the power flow through the cuts and the voltages of the virtual buses known, in a preferred embodiment of the invention, the currents at the interfaces 5,6 of the virtual transmission corridor 4 are computed as $$\bar{i}_1 = \left(\frac{p_{cut1} + jq_{cut1}}{\bar{v}_1}\right)^* \quad (7)$$

$$\bar{i}_2 = \left(\frac{p_{cut2} + jq_{cut2}}{\bar{v}_2}\right)^*$$

From these measurements, estimation of the parameters of the virtual transmission corridor can be computed using the procedure described above. The method of indirectly computing the resulting equivalent currents from the calculated powers makes it possible to combine current measurements from different voltage levels. If all the included lines have the same rated voltage, or all calculations are carried out in per-unit quantities, then the resulting currents can be computed by adding each of the currents of the lines that make up the corresponding interface.

List of Designations
1 generating section
2 load section
3 further section
4 transmission section
5 first interface
6 second interface
7 third interface

The invention claimed is:

1. A computer-implemented method for determining parameters of an equivalent circuit representing a transmission section of an electrical network, where the transmission section is representable as having at least two interfaces with other sections of the network, wherein the method comprises the steps of:
   a) measuring, by means of at least two synchronized phasor measurement units residing at each of the at least two interfaces, a voltage phasor at the interface and a phasor of a current flowing through the interface, measurements at the different interfaces being made essentially simultaneously,
   b) computing, from said voltage and current phasors, values of impedances constituting the equivalent circuit; and
   c) displaying changes in the equivalent circuit based on the computed values of impedances.

2. Method according to claim 1, wherein the transmission section is a transmission corridor having exactly two interfaces to other sections of the network.

3. Method according to claim 2, wherein a first interface connects the transmission corridor to a network section consisting predominantly of power generators, and a second interface connects the transmission corridor to a network section consisting predominantly of power consumers.

4. Method according to claim 3, comprising the further step of computing parameters of a Thévenin equivalent of a network constituted by the transmission section and by the network section consisting predominantly of power generators.

5. Method according to claim 2, wherein the transmission network is represented by one of a T-equivalent and a Π-equivalent circuit.

6. Method according to claim 1, wherein the transmission section comprises three or more interfaces to other sections of the network and the equivalent circuit comprises line impedances interconnecting the interfaces and shunt impedances connecting the interfaces to a common node.

7. Method according to claim 1, wherein at least one interface comprises at least two physical power lines, and the voltage phasor at the interface is determined as a weighted sum of the voltages at the power lines.

8. Method according to claim 7, wherein a current phasor representing a current through the interface is computed from the voltage phasor at the interface and a power flow through the power lines constituting the interface.

9. Data processing system for determining parameters of an equivalent circuit representing a transmission section of an electrical network comprising means for carrying out the steps of the method according to claim 1.

10. Method according to claim 1, wherein the transmission section is a transmission corridor having exactly two interfaces to other sections of the network, and wherein a first interface connects the transmission corridor to a generation section comprising power generators, the method comprising:
   computing, from values of impedances constituting an equivalent circuit representing the transmission section and from a Thévenin equivalent of the generation section, parameters of a second Thévenin equivalent of a network constituted by the transmission section and by the generation section.

11. Method according to claim 10, comprising:
   performing a stability analysis of the electrical network based on the second Thévenin equivalent.

12. A computer program embodied on a computer readable medium for determining parameters of an equivalent circuit representing a transmission section of an electrical network having at least two interfaces with other sections of the network, which computer program is loadable and executable on, a data processing unit and which computer program, when being executed, preforms the steps of computing, from essentially simultaneous measurements at each of the different interfaces of a voltage phasor at the interface and a phasor of a current flowing through the interface, values of a impedances constituting the equivalent circuit, and displaying changes in the equivalent circuit based on the computed values of impedances.

* * * * *